United States Patent
Xu et al.

(10) Patent No.: US 10,197,840 B2
(45) Date of Patent: Feb. 5, 2019

(54) DISPLAY PANEL AND DISPLAY DEVICE

(71) Applicant: BOE Technology Group Co., Ltd., Beijing (CN)

(72) Inventors: Jian Xu, Beijing (CN); Wenbo Li, Beijing (CN); Jianbo Xian, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 88 days.

(21) Appl. No.: 14/893,117

(22) PCT Filed: Jun. 12, 2015

(86) PCT No.: PCT/CN2015/081336
§ 371 (c)(1),
(2) Date: Nov. 23, 2015

(87) PCT Pub. No.: WO2016/086637
PCT Pub. Date: Jun. 9, 2016

(65) Prior Publication Data
US 2016/0357059 A1   Dec. 8, 2016

(30) Foreign Application Priority Data
Dec. 4, 2014   (CN) .................... 2014 2 0759104 U

(51) Int. Cl.
*G02F 1/1335*   (2006.01)
*G02F 1/1339*   (2006.01)
*G02F 1/1368*   (2006.01)

(52) U.S. Cl.
CPC ...... *G02F 1/133512* (2013.01); *G02F 1/1339* (2013.01); *G02F 1/133528* (2013.01);
(Continued)

(58) Field of Classification Search
CPC ............. G02F 1/1335; G02F 1/133509; G02F 1/133512; G02F 1/133514;
(Continued)

(56) References Cited

U.S. PATENT DOCUMENTS

2003/0095219 A1\* 5/2003 Lee .................. G02F 1/133512
349/110
2003/0123017 A1   7/2003 Kim et al.
(Continued)

FOREIGN PATENT DOCUMENTS

CN   101738782 A   6/2010
CN   201562097 U   8/2010
(Continued)

OTHER PUBLICATIONS

Sep. 11, 2015—(WO) International Search Report and Written Opinion Appn PCT/CN2015/081336 with English Tran.

*Primary Examiner* — William R Alexander
*Assistant Examiner* — Ephrem Mebrahtu
(74) *Attorney, Agent, or Firm* — Banner & Witcoff, Ltd.

(57) ABSTRACT

A display panel and a display device are disclosed. The display panel comprises: a first substrate and a second substrate that are cell-assembled together; a first polarizer that is disposed on a lower side of the first substrate. The first substrate and the second substrate are sealed by a sealing material disposed in a periphery region of both the first substrate and the second substrate. A display area is an area on the first substrate inside the sealing material and a first non-display area is an area that is aligned with the second substrate on the first substrate and outside of the sealing material. The first substrate extends outward on a side of the first non-display area to protrude out of the second substrate; the first polarizer extends outward on the side of the first non-display area to protrude out of the second substrate.

16 Claims, 1 Drawing Sheet

(52) U.S. Cl.
CPC ...... *G02F 1/1368* (2013.01); *G02F 1/133514* (2013.01); *G02F 2001/133531* (2013.01)

(58) Field of Classification Search
CPC ......... G02F 1/133528; G02F 1/133555; G02F 1/1339; G02F 1/13394; G02F 1/1341; G02F 1/1368; G02F 2001/133531
See application file for complete search history.

(56) References Cited

U.S. PATENT DOCUMENTS

| | | | |
|---|---|---|---|
| 2005/0151900 A1* | 7/2005 | Tsai | G02F 1/133512 349/110 |
| 2009/0284692 A1* | 11/2009 | Yang | G02F 1/1336 349/95 |
| 2010/0164881 A1* | 7/2010 | Kuo | G06F 3/044 345/173 |
| 2011/0134378 A1* | 6/2011 | Tsuboi | G02F 1/133512 349/110 |
| 2011/0222218 A1* | 9/2011 | Kim | H04N 5/65 361/679.01 |
| 2012/0105761 A1* | 5/2012 | Lee | G02F 1/133308 349/58 |
| 2016/0062182 A1* | 3/2016 | Cho | G02F 1/133528 359/483.01 |
| 2016/0093684 A1* | 3/2016 | Youk | H01L 27/3272 257/40 |
| 2016/0334656 A1* | 11/2016 | Senokuchi | G02F 1/1339 |

FOREIGN PATENT DOCUMENTS

| | | |
|---|---|---|
| CN | 202126558 U | 1/2012 |
| CN | 103913911 A | 7/2014 |
| CN | 204229083 U | 3/2015 |
| JP | 2004245916 A | 9/2004 |

* cited by examiner

DISPLAY PANEL AND DISPLAY DEVICE

The application is a U.S. National Phase Entry of International Application No. PCT/CN2015/081336 filed on Jun. 12, 2015, designating the United States of America and claiming priority to Chinese Patent Application No. 201420759104.6 filed on Dec. 4, 2014. The present application claims priority to and the benefit of the above-identified applications and the above-identified applications are incorporated by reference herein in their entirety.

TECHNICAL FIELD

At least one embodiment of the present invention pertains to a display panel and a display device.

BACKGROUND

TFT-LCDs (Thin Film Transistor Liquid Crystal Displays), as a kind of flat panel display device, are more and more widely used in high-quality display field due to their advantages such as small size, low power consumption, no radiation, relatively low manufacture cost and so on. Displays with narrow frames are gradually put into market with the development of display technology and increased demands of customers.

A TFT-LCD display panel is formed by cell-assembling of a first substrate and a second substrate. A sealing material is provided, between the first substrate and the second substrate, with a certain wideness along the edge portions of the two substrates. The first substrate is generally aligned with the second substrate on a side outside the sealing material. A certain amount of light emitted from a backlight source, instead of passing a polarizer, will directly irradiate on a region of the first substrate that is not corresponding to a polarizer. In such a case, some light can irradiate on a color filter layer of the second substrate due to refraction at a certain angle. Therefore, a certain amount of light can pass through the polarizer disposed on the second substrate, and furthermore a display device is usually manufactured with a narrow frame, so users can see a bright line if they watch at an angle that is approximately parallel to the screen of the display device, which can even disadvantageously influence the display effect of the display device in a severe case.

SUMMARY

A display panel and a display device are provided in the embodiments of the present invention, which can solve the problem of a bright line possibly appeared on an edge of a display screen because of light leakage when a display device is watched at an angle from a side of the display device, thus improving display effect of the display device.

A display panel is provided in at least one of the embodiments of the present invention, comprising a first substrate and a second substrate that are cell-assembled together, and a first polarizer that is disposed on a lower side of the first substrate. The first substrate and the second substrate are sealed by a sealing material disposed in a periphery region of both the first substrate and the second substrate. A display area is an area that is on the first substrate and inside the sealing material, and a first non-display area is an area that is aligned with the second substrate, on the first substrate and outside of the sealing material. The first substrate extends outward on a side of the first non-display area to protrude out of the second substrate; the first polarizer extends outward on the side of the first non-display area to protrude out of the second substrate.

For example, the display panel further comprises a light-blocking layer, and the light-blocking layer is provided on the first substrate within the first non-display area.

For example, the light-blocking layer is formed of a material with light-blocking property.

For example, the material for forming the light-blocking layer includes: a metal material, a metal alloy material, a black resin material or a photo-sensitive organic material added with melanin.

For example, a thickness of the light-blocking layer is 0.1~4 μm.

For example, a distance, between an outer edge of the first substrate on a side protruding out of the second substrate and an edge of the sealing material on a side away from the display area, is greater than or equal to a distance between the outer edge of the first substrate on the side protruding out of the second substrate and an outer edge of the light-blocking layer on a side closer to the sealing material.

For example, a distance, between an outer edge of the first substrate on the side protruding out of the second substrate and an outer edge of the light-blocking layer on the side closer to the sealing material, is greater than a distance between the outer edge of the first substrate on the side protruding out of the second substrate and an outer edge of the second substrate on a side closer to the first non-display area.

For example, a distance, between an outer edge of the first substrate on the side protruding out of the second substrate and an outer edge of the first polarizer on a side closer to the first non-display area, is greater than a distance between the outer edge of the first substrate on the side protruding out of the second substrate and an outer edge of the light-blocking layer on a side away from the sealing material.

For example, the display panel further comprises a second polarizer, and the second polarizer is disposed on the second substrate.

For example, the first substrate is an array substrate and the second substrate is a counter substrate.

A display device is provided in at least one of the embodiments of the present invention, including anyone of the display panels mentioned above.

BRIEF DESCRIPTION OF THE DRAWINGS

In order to clearly illustrate the technical solution of the embodiments of the invention or some related existing technology, the drawings of the embodiments will be briefly described in the following; it is obvious that the described drawings are only related to some embodiments of the invention and, based on the drawings herein, those skilled in the art can obtain other drawings without any inventive work.

DRAWING REFERENCE SIGNS

1—first substrate; 2—second substrate; 3—sealing material; 4—first polarizer; 5—second polarizer; 6—light-blocking layer; 11—display area; 12—first non-display area.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Figure 1:
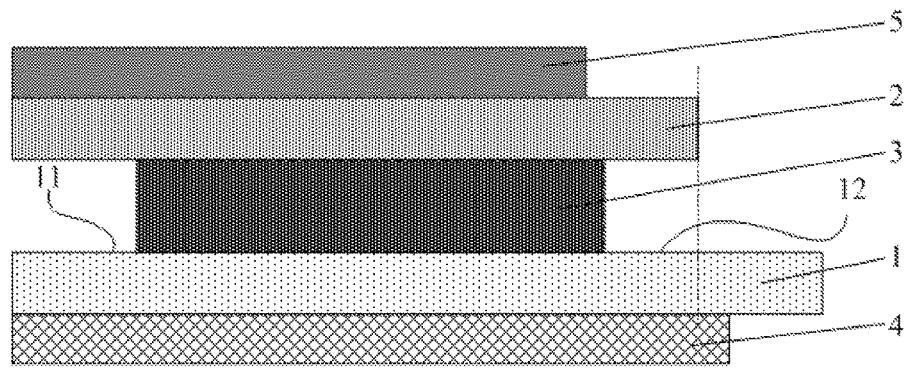
FIG. 1 is a schematic view of structure of a display panel in an embodiment of the present invention.

A display panel is provided in an embodiment of the present invention. As illustrated in FIG. 1, the display panel comprises a first substrate 1 and a second substrate 2 that are cell-assembled together. The first substrate 1 and the second substrate are sealed by a sealing material 3 disposed in the periphery region of both the first substrate 1 and the second substrate 2. The area on the first substrate inside the sealing material 3 is a display area 11, and the area that is aligned with the second substrate, on the first substrate and outside the sealing material is a first non-display area 12. The display panel further comprises: a polarizer 4 disposed on a lower side of the first substrate; the first substrate 1 extends outward, on the side of the first non-display area 12, to protrude out of the second substrate 2; the first polarizer 4 extends outward, on the side of the first non-display area 12, to protrude out of the second substrate 2.

As illustrated in FIG. 1, the first non-display area on the first substrate is the area on the first substrate that is outside the sealing material and extends until the dashed line. The position indicated by the dashed line is where the first substrate is aligned with an edge of the second substrate.

A non-display area is an area of the display panel outside of the sealing material. The non-display area includes a first non-display area and may further include, for example, a second non-display area and so on.

For example, the length of the portion, of the first substrate, extending outward on the side of the first non-display area 12 is not specifically limited, as long as the first substrate protrudes out of the second substrate. According to actual design requirement, it is preferable to make the length of the portion, of the first substrate, extending outward more, so as to prevent light that is from a backlight source irradiated on the first non-display area from being refracted to the display region. However, by taking the design trend connected with a display panel with a narrow frame into consideration, the length of the portion, of the first substrate, extending outward should not be too long in actual manufacturing. The first polarizer should extend outward to exceed the second substrate, on the basis of which the edge of the first polarizer may infinitely approach the edge of the first substrate in turn, so as to maximumly avoid occurrence of a bright line on a display screen when a user watches from a side at an angle with respect to the display screen.

As illustrated in FIG. 1, the display panel further comprises a second polarizer 5 disposed on the second substrate.

For example, the first substrate in the embodiment can be an array substrate and the second substrate can be a counter substrate such as a color filter substrate. The sealing material can be a sealant.

It should be noted, in the embodiment of the present invention, that the counter substrate is disposed opposite to the array substrate while the counter substrate and the array substrate respectively are an upper substrate and a lower substrate of a display panel. A display structure such as a thin film transistor array is typically formed on the array substrate, and color resin is typically formed on the counter substrate. For example, the counter substrate can be a color filter substrate.

A display panel is provided in at least one embodiment of the present invention, and the display panel comprises: a first substrate and a second substrate that are cell-assembled together. The first substrate and the second substrate are sealed by a sealing material disposed in the periphery region of both the first substrate and the second substrate. A display area is an area on the first substrate inside the sealing material, and a first non-display area is an area that is aligned with the second substrate, on the first substrate and outside of the sealing material. Besides, the edge of the first substrate on a side aligned with the second substrate extends outward to protrude out of an edge of the second substrate, and the edge of the polarizer, which is disposed on a lower side of the first substrate, on the same side of the first substrate also extends outward to protrude out of the second substrate. In this way, light from a backlight source is polarized via a polarizer before irradiating on the first substrate in the first non-display area, and the light can emit out in a same direction, thus a user will not see a bright line when watching at any angle with respect to the display screen of a display device. It is able to solve the problem of a bright line appearing on an edge of a display screen because of light leakage when a display device is watched at an angle from a side of the display device, thus improving display effect of the display device.

Figure 2:
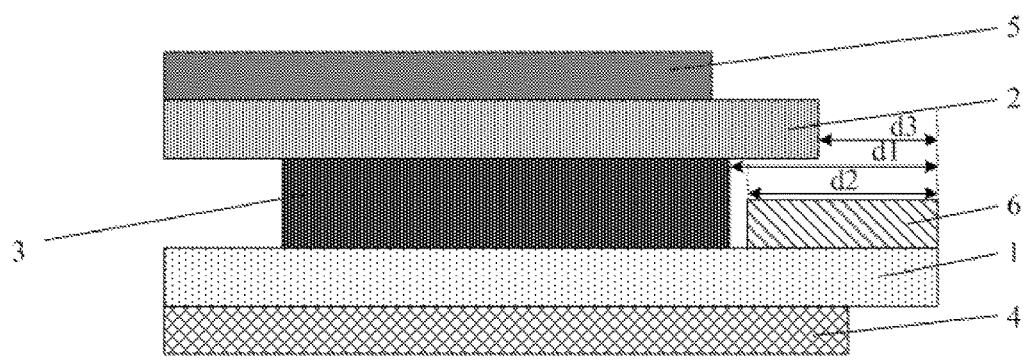
FIG. 2 is a schematic view of structure of another display panel in an embodiment of the present invention.

As illustrated in FIG. 2, the display panel can further comprise: a light-blocking layer 6, and the light-blocking layer 6 is disposed on the first substrate 1 within the first non-display area.

The light-blocking layer 6 is formed of a material with light-blocking property.

For example, a light-blocking layer can be formed in the non-display area of the first substrate on the basis that the first substrate extends outward on a side of the non-display area. In this way, the light irradiated on the first non-display area can be blocked so as to fully avoid phenomenon of light leakage that is occurred on a display screen when a user watches from a side, thus guaranteeing viewing effects of the user.

For example, materials for forming the light-blocking layer include: a metal material, a metal alloy material, a black resin material, or a photo-sensitive organic material added with melanin.

For example, the light-blocking layer can be formed along with a gate metal layer or a data line layer if the material of the light-blocking layer is the same as that of the gate metal layer or the data line layer, achieving a purpose of light-blocking effects without incurring additional manufacture processes.

For example, a thickness of the light-blocking layer can be 0.1~4 μm.

Besides realizing light-blocking function, the light-blocking layer meets the trend of ultrathin display design of a display device. For example, a thickness of the light-blocking layer can be 0.28~0.48 μm if the light-blocking layer is formed of the same material as that of a gate metal layer; a thickness of the light-blocking layer can be 0.3~0.5 μm if the light-blocking layer is formed of the same material as that of a data line. A thickness of the light-blocking layer can be greater than 0.1 μm if the material for forming the light-blocking layer is a black resin.

For example, as illustrated in FIG. 2, a distance d1, between an outer edge of the first substrate on the side protruding out of the second substrate and an edge of the sealing material on the side away from the display area, is greater than or equal to a distance d2 between the outer edge of the first substrate on the side protruding out of the second substrate and an outer edge of the light-blocking layer on the side closer to the sealing material. It is designed in this manner to avoid, in forming of the light-blocking layer with a metal material or a metal alloy material, occurrence of chemical or physical reactions of the light-blocking layer with air, which reaction can influence performance of electrodes on the first substrate and produce adverse effects.

For example, as illustrated in FIG. 2, the distance d2, between the outer edge of the first substrate on the side protruding out of the second substrate and the outer edge of the light-blocking layer on the side closer to the sealing material, is greater than a distance d3 between the outer edge of the first substrate on the side protruding out of the second substrate and an outer edge of the second substrate on the side closer to the first non-display area. It is designed in this manner to make the light-blocking layer better cover the region extending outward of the first substrate so as to better achieve light-blocking function.

Figure 3:
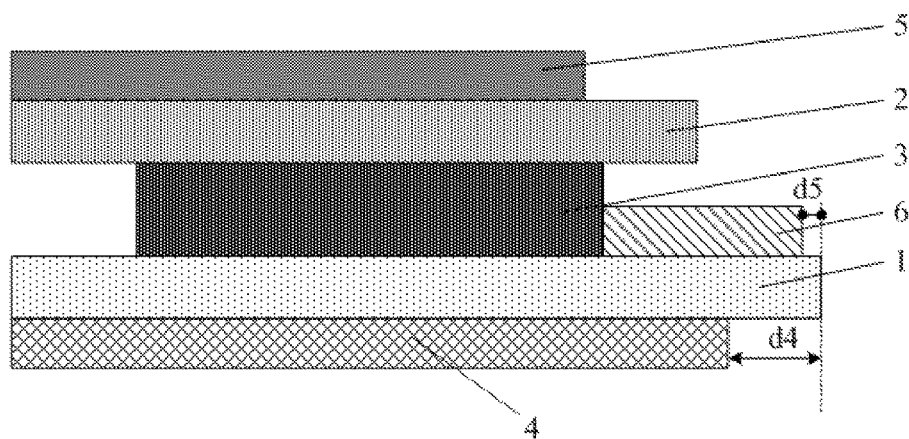
FIG. 3 is a schematic view of structure of a still another display panel in an embodiment of the present invention.

For example, as illustrated in FIG. 3, for example, a distance d4, between the outer edge of the first substrate on the side protruding out of the second substrate and an outer edge of the first polarizer on the side closer to the first non-display area, is greater than, a distance d5 between the outer edge of the first substrate on the side protruding out of the second substrate and an outer edge of the light-blocking layer on the side away from the sealing material. In this way, a non-polarized area can be ensured and enabled to shorten the light path if the light-blocking layer is formed of a metal material or a metal alloy material, making the light unable to irradiate on a region that is viewable from a side of a display screen by a user and further avoiding occurrence of light leakage in the case of side-watch.

As illustrated in FIG. 3, one side of the exemplary light-blocking layer contacts with the sealing material while the other side does not reach the outer edge of the first substrate so as to, while ensuring light-blocking function of the light-blocking layer, prevent the peeling problem which may be caused by rubbing upon the substrate and contacting with the substrate from influencing the light-blocking effect.

A display panel is provided in the embodiment of the present invention, and comprises: a first substrate and a second substrate that are cell-assembled together. The first substrate and the second substrate are sealed by a sealing material disposed in the periphery region of both the first substrate and the second substrate. A display area is an area on the first substrate inside the sealing material, and a first non-display area is an area that is aligned with the second substrate, on the first substrate and outside of the sealing material. Besides, an edge of the first substrate on the side aligned with the second substrate extends outward to protrude out of an edge of the second substrate, and an edge of a polarizer, disposed on a lower side of the first substrate, on the same side of the first substrate also extends outward to protrude out of the second substrate. In this way, the light from a backlight source is polarized via a polarizer before irradiating on the first substrate in the first non-display region, and the light can emit out in a same direction, thus a user will not see a bright line when watching at any angle with respect to the display screen of a display device. It is able to solve the problem of a bright line occurred on an edge of a display screen because of light leakage when a display device is watched at an angle from a side of the display device, thus improving display effect of a display device. Therefore, it is able to avoid the problem of light leakage when a display screen is watched by a user from a side.

A display device is also provided in the embodiment of the present invention, including any display panel provided in the embodiment corresponding to FIG. 1~FIG. 2. For example, the display device can be any product or component having a display function such as a cell phone, a watch, a tablet computer, a TV set, a laptop computer, a digital photo frame, a navigator or the like.

A display device provided in the embodiment of the present invention, and comprises: a first substrate and a second substrate that are cell-assembled together. The first substrate and the second substrate are sealed by a sealing material disposed in the periphery region of both the first substrate and the second substrate. A display area is the area on the first substrate inside the sealing material, and a first non-display area is an area that is aligned with the second substrate, on the first substrate and outside of the sealing material. Besides, an edge of the first substrate on the side aligned with the second substrate extends outward to protrude out of an edge of the second substrate, and an edge of a polarizer, disposed on a lower side of the first substrate, on the same side of the first substrate also extends outward to protrude out of the second substrate. In this way, the light from a backlight source is polarized via a polarizer before irradiating on the first substrate in the first non-display area, and the light can emit out in a same direction, thus a user will not see a bright line when watching at any angle with respect to a display screen of a display device. It is able to solve the problem of a bright line occurred on an edge of a display screen because of light leakage when a display device is watched at an angle from a side of the display device, thus improving display effect of the display device. Therefore, it is able to avoid the problem of light leakage when a display screen is watched by a user from a side.

What are described above is related to the illustrative embodiments of the disclosure only and not limitative to the scope of the disclosure; within the scope of the disclosure of the present invention, any changes or replacement that is easy for those skilled in the art should be covered with the protection scope of the present invention. The scopes of the disclosure are defined by the accompanying claims.

This application claims the benefit of Chinese patent application No. 201420759104.6 filed in China on Dec. 4, 2014, which is incorporated by reference herein as part of this application.

The invention claimed is:

1. A display panel, comprising:
a first substrate and a second substrate that is cell-assembled together;
a first polarizer disposed on a lower side of the first substrate; and
a light-blocking layer,
wherein the first substrate and the second substrate are sealed by a sealing material disposed in a periphery region of both the first substrate and the second substrate,
wherein an area that is on the first substrate and inside the sealing material is a display area,
wherein an area that is aligned with the second substrate, on the first substrate and outside of the sealing material is a first non-display area,
wherein the first substrate extends outward on a side of the first non-display area to protrude out of the second substrate, and the first polarizer extends outward on the side of the first non-display area to protrude out of the second substrate, wherein the light-blocking layer is provided on the first substrate and is at least partially located within the first non-display area, wherein an orthographic projection of the light-blocking layer on the first substrate is located at a side of an orthographic projection of the sealing material on the first substrate opposite to the display area, and wherein the light-blocking layer and the first polarizer are at least overlapped with each other in the first non-display area.

2. The display panel according to claim 1, wherein the light-blocking layer is formed of a material with light-blocking property.

3. The display panel according to claim 2, wherein the material for forming the light-blocking layer comprises a metal material, a metal alloy material, a black resin material or a photo-sensitive organic material added with melanin.

4. The display panel according to claim 1, wherein a thickness of the light-blocking layer is 0.1~4 μm.

5. The display panel according to claim 1, wherein a distance, between an outer edge of the first substrate on a side protruding out of the second substrate and an edge of the sealing material on a side away from the display area, is greater than or equal to a distance between the outer edge of the first substrate on the side protruding out of the second substrate and an outer edge of the light-blocking layer on a side closer to the sealing material.

6. The display panel according to claim 1, wherein a distance, between an outer edge of the first substrate on a side protruding out of the second substrate and an outer edge of the light-blocking layer on a side closer to the sealing material, is greater than a distance between the outer edge of the first substrate on the side protruding out of the second substrate and an outer edge of the second substrate on a side closer to the first non-display area.

7. The display panel according to claim 1, further comprising: a second polarizer, wherein the second polarizer is disposed on the second substrate.

8. The display panel according to claim 1, wherein the second substrate is a counter substrate.

9. A display device, comprising the display panel according to claim 1.

10. The display panel according to claim 5, wherein a distance, between the outer edge of the first substrate on a side protruding out of the second substrate and an outer edge of the first polarizer on a side closer to the first non-display area, is greater than a distance between the outer edge of the first substrate on the side protruding out of the second substrate and an outer edge of the light-blocking layer on a side away from the sealing material.

11. The display panel according to claim 5, further comprising: a second polarizer, wherein the second polarizer is disposed on the second substrate.

12. The display panel according to claim 6, further comprising: a second polarizer, wherein the second polarizer is disposed on the second substrate.

13. The display panel according to claim 6, wherein the second substrate is a counter substrate.

14. The display panel according to claim 5, wherein the second substrate is a counter substrate.

15. The display panel according to claim 1, wherein the light-blocking layer is located at a surface of the first substrate, and wherein the surface is a surface of the first substrate, which is opposite to the first polarizer.

16. The display panel according to claim 1, a distance, between an outer edge of the first substrate on a side protruding out of the second substrate and an outer edge of the first polarizer on a side closer to the first non-display area, is greater than a distance between the outer edge of the first substrate on the side protruding out of the second substrate and an outer edge of the light-blocking layer on a side away from the sealing material.

* * * * *